April 19, 1966 J. W. O'BRIEN 3,246,553
SCRAP CHOPPER
Filed July 15, 1964 3 Sheets-Sheet 1

INVENTOR.
JEREMIAH W. O'BRIEN
BY
ATTORNEY.

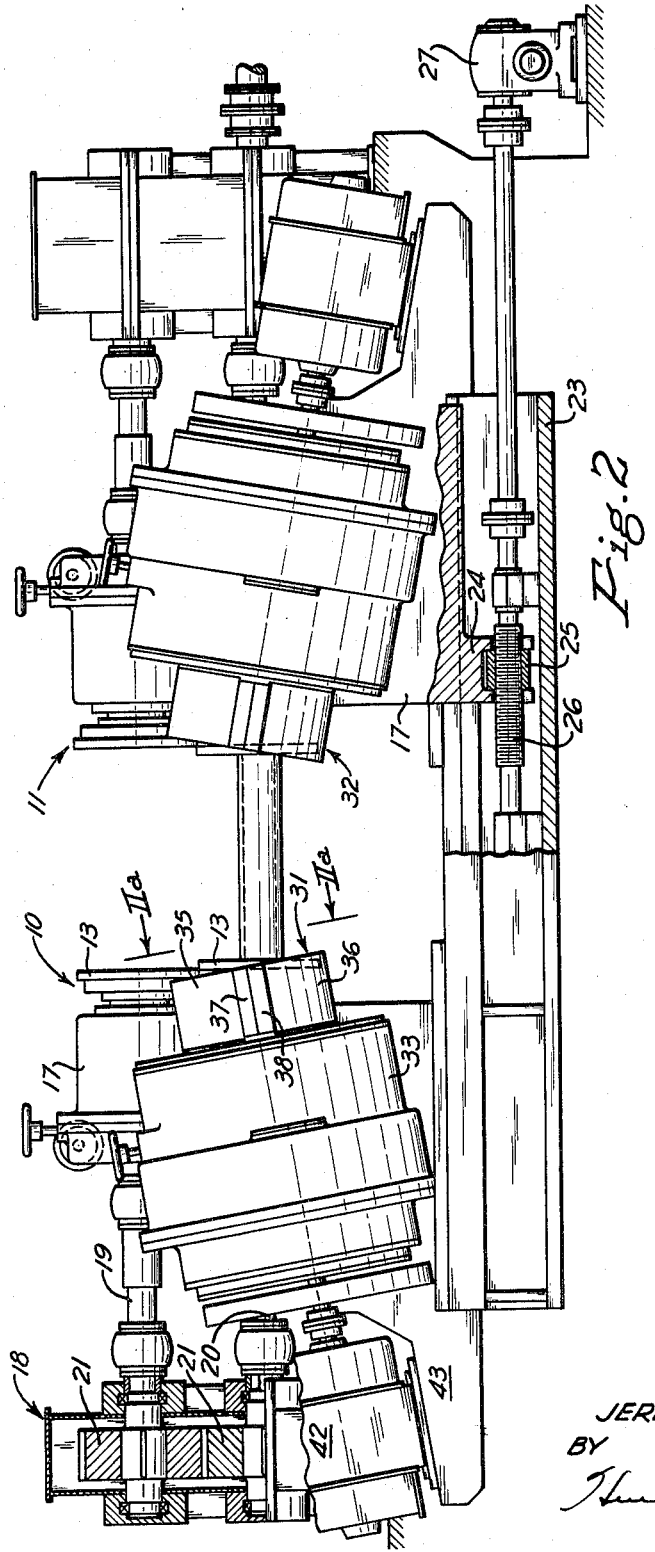

April 19, 1966  J. W. O'BRIEN  3,246,553
SCRAP CHOPPER
Filed July 15, 1964  3 Sheets-Sheet 3
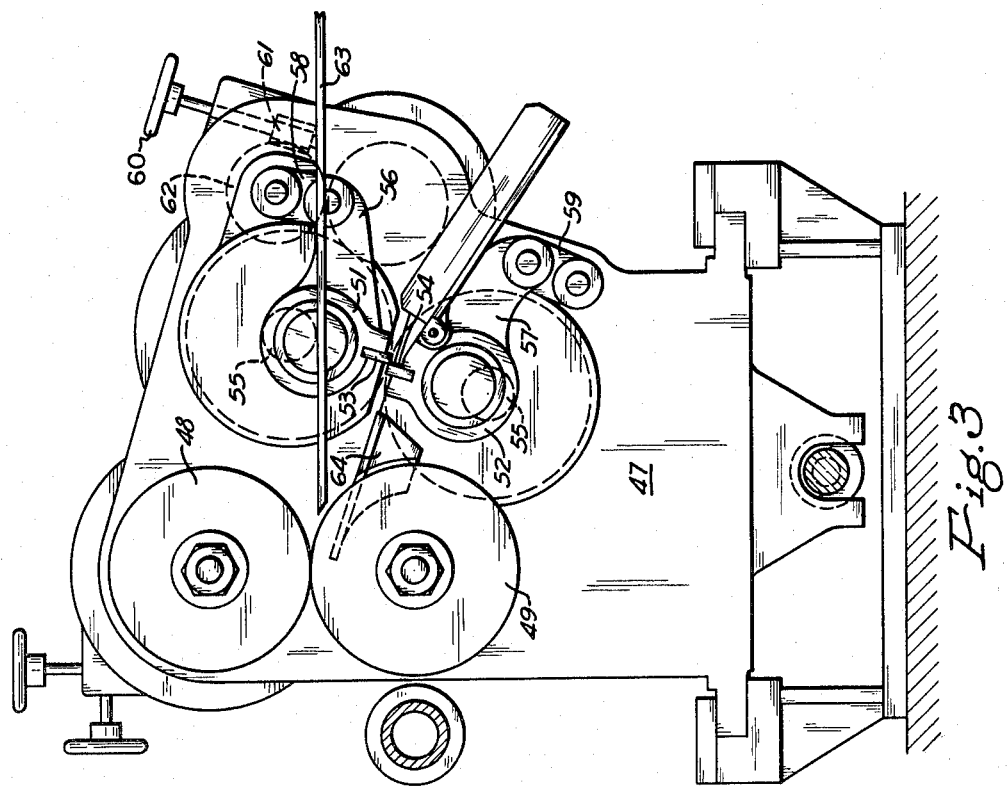
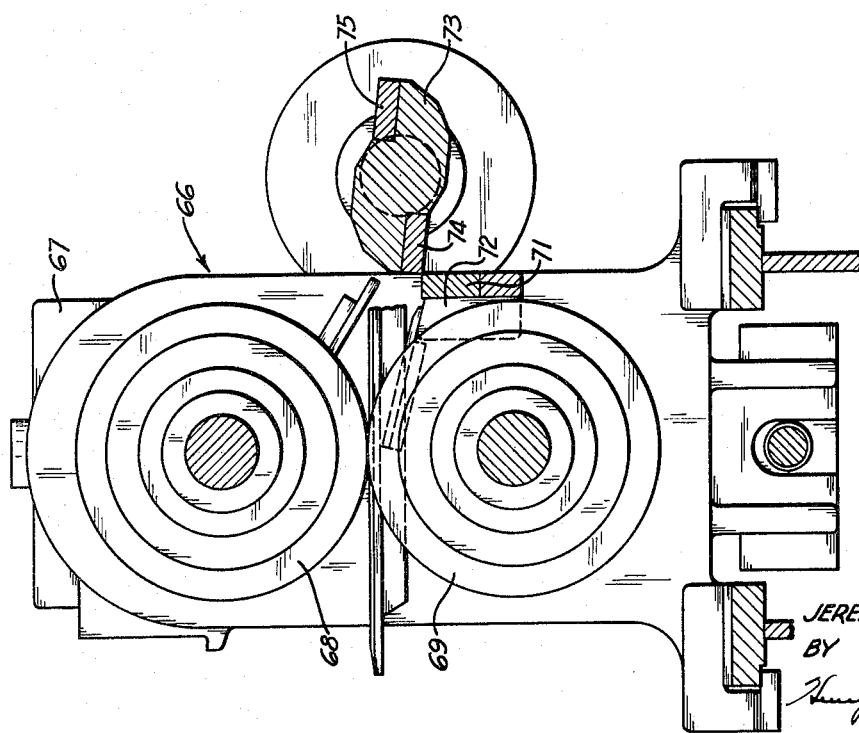
INVENTOR.
JEREMIAH W. O'BRIEN
BY
ATTORNEY.

United States Patent Office 3,246,553
Patented Apr. 19, 1966

3,246,553
SCRAP CHOPPER
Jeremiah Wagner O'Brien, Mount Lebanon, Pittsburgh, Pa., assignor to United Engineering and Foundry Company, Pittsburgh, Pa., a corporation of Pennsylvania
Filed July 15, 1964, Ser. No. 382,741
Claims priority, application Great Britain, Aug. 2, 1963, 30,705/63
8 Claims. (Cl. 83—302)

The present invention relates to an apparatus for severing elongated material, such as strips, sheets and the like, and, more particularly, to shears designed to trim the marginal edges of such material.

In the manufacturing of metallic sheets, strips, and plates, it is customary to rapidly pass the material continuously to a side trimming shear where the irregular marginal edges are removed in a manner to impart straight parallel sides to the material. The marginal edges upon shearing are usually deflected from the path of travel of the material into spatially arranged scrap choppers, one being provided for each marginal edge, where they are cut up into short pieces. In one form the present invention relates to a scrap chopper for use in combination with such a side trimming shear.

There has been a long-standing and well-recognized problem in the operation of scrap choppers for side trimming shears in handling the rapidly traveling marginal edges between the side trimming shears and the scrap choppers. Because of the influence of the side trimming shearing action on the shape of the marginal edges, coupled with the lightness of the marginal edges, and the speed at which they travel, it has always been found extremely difficult to guide the strip into the scrap choppers and, as a result, much delay is usually experienced in the frequent cobbling of the marginal edges.

One of the major contributing factors to the unsuccessful handling of the marginal edges has reference to the fact that under normal practice a considerable amount of space must be provided between the knives of the side trimming shears and the knives of scrap choppers. The controlling factor in determining the distance between these knives has been the physical size of the housings, etc., of the two units. Heretofore, the entire upper knife head of the scrap choppers has always been arranged below the plane in which the material passed, which construction dictated that the scrap chopper knives, of necessity, had to be located a substantial distance from the knives of the side trimmer.

Another major factor that brought about the need of maintaining a substantial distance between the side trimming knives and the knives of the scrap chopper was that an advantage was gained by keeping the angle of deflection of the marginal edges from becoming too great, which, in order to accomplish, required the lengthening of the distance between the two sets of knives. While there were other contributing factors, it is believed that they, as well as the ones noted, are apparent from U.S. Patent No. 2,084,967 which issued to C. R. Babb on June 22, 1937 and U.S. Patent No. 2,251,312 which issued to C. M. Yoder on August 5, 1941. These patents are of particular interest in that they seek to solve, in part, the problem incident to guiding the strip between the two shears by working with what is considered the conventional arrangement of the side trimmer and scrap chopper shears. It will be noted in the drawings of these patents that a considerable distance exists between the scrap chopper knives and the knives of the side trimming shear.

The present invention, in one form relates to a scrap chopper shear having upper and lower knives which are tilted, that is, arranged at an angle with their lower portions being most adjacent to the adjacent edge of the parent material, and by which arrangement at least a portion of the upper scrap chopper knife can be arranged above a plane coinciding with the path of the parent material in close proximity to the point where the portion of the material to be sheared is deflected away from the parent material.

More particularly, the present invention relates to a scrap chopper shear for use in conjunction with a side trimming shear, wherein there is provided for each marginal edge of the strip to be sheared a pair of cooperative heads, each head having a knife that is adapted to be brought into shearing relationship with the marginal edges after they have been severed from the main body of the strip by the side trimmer shear, the heads being tilted at an angle so that their lower portions are most adjacent to a plane passing through the center of the path of travel, in which portion the upper heads are arranged above a plane containing the path of travel of the strip and the inner ends of the upper heads are located in close proximity, but in a non-obstructive relationship with respect to the sheared edges of the body of the strip.

These features and advantages, as well as others, will become more evident from the following description when read in the light of the accompanying drawings of which:

FIGURE 2 is an elevational view, partly in section, of the shearing arrangement shown in FIGURE 1, illustrating particularly the oblique relationship of the scrap chopping shears;

FIGURE 2a is a view taken on lines IIa—IIa of FIGURE 2 showing the scrap chopping shear;

FIGURE 3 is an elevational sectional view of a second form of a scrap chopping shear constructed in accordance with the present invention, and FIGURE 4 is an elevational sectional view of a third embodiment of the side trimming and scrap chopping shear constructed in accordance with the present invention.

Figure 1:
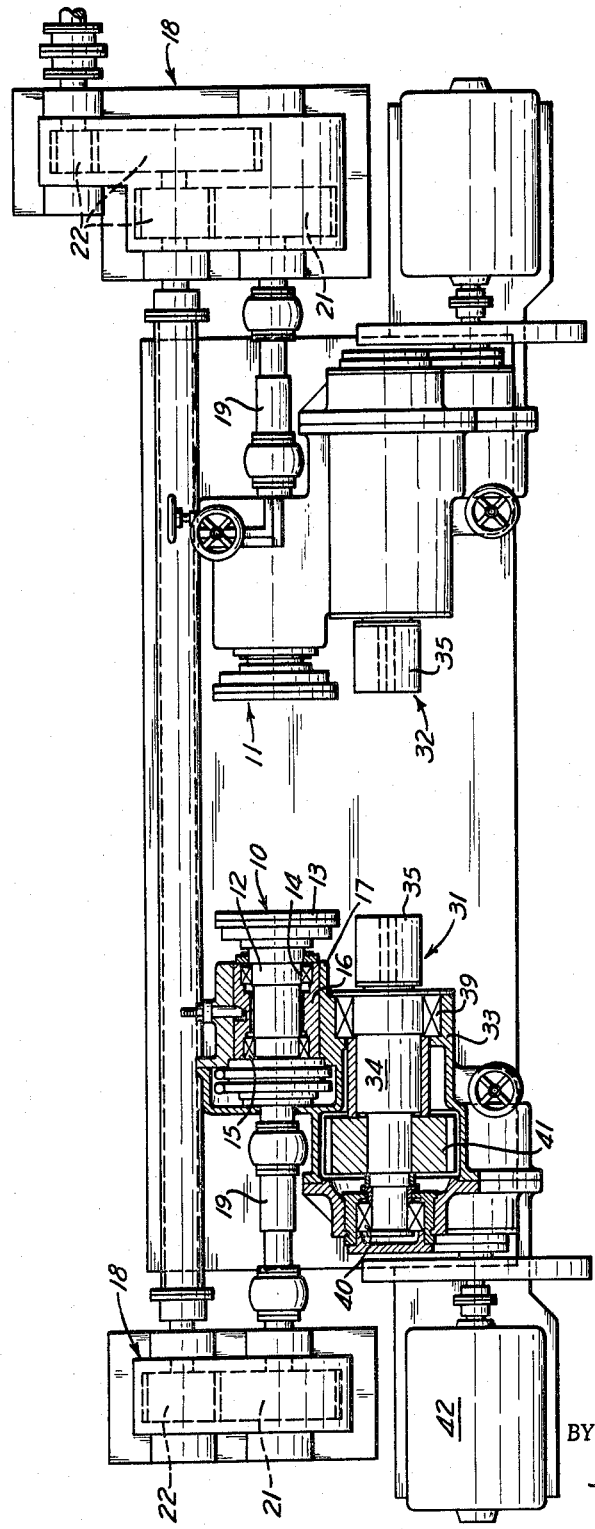
FIGURE 1 is a plan view, partly in section, of a side trimming and scrap chopping shearing arrangement which incorporates the features of the present invention.

With reference to FIGURES 1 and 2, there are illustrated two side trimming shears 10 and 11 for severing the opposite marginal edges of a strip passed therebetween in a horizontal direction as one views these figures. In view of the symmetry between these shears, a description of the shear 10 will only be given. The shear 10 comprises two identical spaced-apart arbors 12, only one of which is shown in the drawings, having overhanging ends on which cooperative side trimming knives 13 are mounted. These knives, as shown in FIGURE 2, are spaced one from another in a manner to present cooperative cutting surfaces between which is passed the marginal edge of a strip, not shown. As FIGURE 1 shows, the arbors 12 are rotatably received in spaced-apart bearings 14 and 15 which are contained in a chuck 16, which in turn is received in a shear housing 17. The outer ends of the arbors 12 are connected to a common gear drive 18 through spindles 19 and 20 by which means torque is furnished to the knives 13. As shown in FIGURE 2, the gear drive consists of meshing gears 21 which are mounted on the respective arbors and whereby a proper speed relationship is obtained, although the knives will be rotated in opposite directions. The lower gear 21 is connected to a train of gears 22 which, in turn, is connected to a motor, not shown.

In referring now to the side trimming shear 11, as illustrated in FIGURE 2, attention will be directed to the traversing means for the shear, in which regard the bottom of the shear 11 is slidably carried by a base 23 for which reason there is provided a pair of guideways whereby the shear can be moved toward and away from the strip. To accomplish this movement the lower portion of the shear housing 17 is provided with a bracket 24 having an opening which receives a nut 25, the nut, in turn, receiving a threaded portion of a shaft 26, the outer end of the shaft being connected to a gear-motor unit 27. It is to be understood that the shaft 26 continues toward the shear 10 and a similar arrangement is provided for the shear 10, with the threads of the shaft 26 being opposite head so that the shears will move toward and away from each other on the operation of the motor 27.

It is believed that this general description of the side trimming shear will be sufficient to understand its operation, in which regard it will be noted that further details and explanation can be had by referring to the aforesaid Babb and Yoder U.S. patents.

With reference now to the scrap chopper shears provided for the side trimming shears 10 and 11, reference is made first to FIGURE 2, where there is shown for each side trimming shear a scrap chopper shear 31 and 32, respectively. Again, in view of the symmetry between the scrap chopper shears 31 and 32, it is deemed only necessary to describe one of them and for this purpose the scrap chopper shear 31 has been selected. The scrap chopper shear 31 is provided with a housing 33 which is secured to and carried by the housing 17 of the side trimming shear 10. Within the housing there are provided a pair of identical arbors 34, only one of which is shown in the drawings, and that being in FIGURE 1.

As shown in FIGURE 2, these arbors are obliquely arranged with respect to the plane containing the axes of the side trimming knives 31. The other ends of the arbors are provided with cylindrical shear drums 35 and 36 to which there are secured cooperative knives 37 and 38, respectively, which, upon rotation of the shear heads, are brought into a cutting relationship, as indicated best in FIGURE 2a. The arbors 34 are rotatably supported in the housing 33 by bearings 39 and 40, intermediate the bearings there is connected to the upper arbor a gear 41 which meshes with an identical gear, not shown, mounted on the lower arbor, and thereby synchronized, but opposite rotation of the shear drums 35 is achieved. The gears 41 are driven by a pinion, not shown, which is connected to an electrical motor 42, the base of which is supported by a bracket 43 constructed as an integral part of the side trimming shear 10. It will be appreciated, in view of the fact that the scrap chopper shear 31 is connected to the housing of the side trimming shear, it will move with the latter.

Attention is again directed to FIGURE 2 in which respect it will be observed that the oblique position of the drums 35 and 36 of the scrap chopper shear allows a considerable portion of the upper head to be arranged above the plane coinciding with the path of the strip. In this regard it will also be noted that the outer edge of the upper drum is positioned immediately adjacent, but yet behind, the shearing zone of the side trimming knives 13. As a result it is possible to considerably reduce the distance between the side trimming shears and the scrap chopping shears. This substantial reduction in the distance between these two units is best illustrated in FIGURES 1, 3, and 4.

With reference to FIGURE 3, there is shown a second embodiment of the present invention in which regard, instead of the rotatable drum-type scrap chopper shear illustrated in FIGURES 1 and 2, a reciprocating scrap chopping shear arrangement is provided. This shear includes a shear housing 47 to which there is received a pair of rotating side trimming shears 48 and 49 similar in construction to the side trimming shears illustrated in FIGURES 1 and 2. In conjunction with the side trimming shears, there is provided for each marginal edge a scrap chopper shear consisting of an upper and lower rotating knife head 51 and 52 to which there is secured cooperative knives 53 and 54. FIGURE 3 shows the operative position of the knives. The heads 51 and 52 are connected to individual cranks 55 by which means the heads are given an elliptical path of rotation during the shearing cycle. The cranks are connected to a drive, not shown, similar to the drive illustrated with respect to the shear in FIGURES 1 and 2. The heads 51 and 52 are also connected to links 58 and 59 by brackets 56 and 57, respectively, whereby a controlled path of rotation of the heads is obtained. The overlapping relationship of the knives 53 and 54 is controlled by an adjustment of the pivot point of the link 58 for which reason there is provided a hand wheel 60, the lower end of which is connected to a worm 61 which meshes with a gear 62 which, in turn, rotates an eccentric, not shown, on which the upper end of the link 58 is rotatably mounted.

Although not evident in FIGURE 3, it will be appreciated that the knife heads 51 and 52 are obliquely arranged with respect to a plane containing the axes of the side trimming shears 48 and 49 and, hence, are similar to the arrangement shown in connection with the shear shown in FIGURE 2. The shear is provided with a horizontal guiding platen 63 which conveys the sheared material over the scrap chopping shears and obliquely arranged guiding platens 64 which convey the marginal edges into the scrap shears. As previously noted, FIGURE 3 serves to illustrate the extremely short distance that exists between the scrap chopper and the side trimmers, thus minimizing the difficulty in feeding the marginal edges to the scrap chopper shears.

FIGURE 4 shows a third embodiment of the present invention, in which regard there is provided a side trimming shear 66 consisting of a housing 67 for receiving a cooperative pair of side trimming knives 68 and 69, similar in construction to the side trimming shears illustrated in FIGURES 1, 2, and 3, and for which reason further description of them will not be given. With respect to the scrap chopping shear arrangement provided for the shear 66, there is provided on the housing 67 a stationary scrap chopper knife 71 which is mounted in a block 72 retained by and secured to the lower portion of the side trimming shear housing 67. Spaced from the housing and arranged in an oblique relationship with respect to the plane containing the axes of the side trimming knives 68 and 69, there is a rotatable dual knife head 73.

As shown, the head 73 has two knives 74 and 75 arranged 180° apart which on rotation are adapted to be brought into a cooperative shearing relationship with the stationary scrap knife 71. Here again, it will be noted that the distance between the side trimming knives and the scrap chopper knife is considerably less than the present-day shearing arrangement as exemplified in the aforesaid Yoder and Babb U.S. patents.

It will be appreciated that while several embodiments of the present invention have been illustrated, there are other shearing arrangements where the features of the obliquely arranged scrap knives can be utilized with equal success. It will also be appreciated that the invention herein described may be employed in other types of shearing operations, such as those employed in the manufacture of rubber, paper, wood and the like.

In accordance with the provisions of the patent statutes, I have explained the principle and operation of my invention and have illustrated and described what I consider to represent the best embodiment thereof. However, I desire to have it understood that within the scope of the appended claims, the invention may be practiced otherwise than as specifically illustrated and described.

I claim:

1. In combination with a side trimming shear for shearing a marginal portion from strip-like material moving in a selected path,
wherein said side trimming shear including a pair of cooperative side trimming knives, the cutting edges of which engage and shear the material in a direction perpendicular to the path of travel of the material,
a scrap chopper shear for cutting into lengths a marginal portion previously trimmed from the material by said side trimming shear,
said scrap chopping shear including a pair of cooperative knife holders, each carrying a knife and at least one of which is displaced to effect a cutting of a marginal portion fed between the knives,
said knife holders being arranged so that their cutting knives engage each other to cut the material at a location vertically displaced from the path of travel of the material,
the plane containing the axis of said displaced knife holder being inclined relative to the adjacent trimmed edge of the material, and
said knife holders terminating so as not to interfere with the trimmed portion of the material and wherein the portion of the uppermost knife holder carrying the knife thereof extends to one side of the portion of the material and within an area defined by the width of the marginal portion.

2. In combination with a side trimmer according to claim 1, wherein the lower knife holder has a portion that extends to one side of and within an area defined by the width of the trimmed material.

3. A scrap chopper, in accordance with claim 1, wherein said knife holders consist of upper and lower rotatable drums arranged to receive the marginal portion therebetween,
means for rotating said drums synchronously in opposite directions,
said upper drum being tilted relative to the adjacent edge of the material wherein the portion thereof closest to the material falls outside of a continuation of the point of separation between the marginal portion and the material when shearing takes place by said side trimming shear,
said upper drum having a portion extending above a plane coinciding with the path of movement of the material, and
wherein said lower drum has a portion that extends below the path of movement of the material.

4. A scrap chopper, in accordance with claim 1, wherein said side trimming shear includes a pair of cooperative knives and,
wherein each of said holders is mounted on an eccentric in spaced vertical relationship,
means for rotating said eccentrics to bring the knives of said holders into a position to effect a cut,
the upper knife holder being tilted relative to the adjacent edge of the material, wherein the portion thereof closest to the material falls outside of a continuation of the point of separation between the marginal portion and the material when shearing takes place by said side trimming shear,
said upper holder having a portion extending above a plane coinciding with the path of movement of the material, and
wherein the lower knife holder has a portion that extends below the path of movement of the material.

5. A scrap chopper, according to claim 1, wherein said holders are arranged in spaced vertical relationship, one of said holders being stationarily mounted,
the upper holder being rotatably mounted and so arranged and tilted relative to the adjacent edge of the material, wherein the portion thereof closest to the material falls outside of a continuation of the point of separation between the marginal portion and the material when shearing takes place by said side trimming shear,
said upper holder having a portion extending above a plane coinciding with the path of movement of the material, and
wherein the lower holder of said scrap chopper has a portion that extends below the path of movement of the material.

6. A scrap chopper, according to claim 5, wherein said rotatable head includes at least two knives which are adapted to be alternately brought into a cutting relationship with the knife carried by said lower holder.

7. A scrap chopper, according to claim 1, wherein said scrap chopper shear is carried by said side trimming shear, and
means for moving said side trimming shear relative to the path of movement of material.

8. A scrap chopper shear, according to claim 1, in which there is provided a pair of separate scrap chopper shears, each arranged to cut into short lengths the opposite edges trimmed from said material by said side trimming shear, and
the knife holders of each scrap chopper being arranged so that a plane perpendicular to the axes of the holders converge below the path of movement of the material and form an acute angle with a plane passing through the center of the path of movement of the material.

References Cited by the Examiner

UNITED STATES PATENTS

| | | | |
|---|---|---|---|
| 1,636,267 | 7/1927 | Williams | 83—302 X |
| 1,797,950 | 3/1931 | Forman | 83—408 |
| 2,133,595 | 10/1938 | Thomas | 83—302 |
| 2,497,155 | 2/1950 | Davis | 83—408 |
| 2,776,711 | 1/1957 | Bas | 83—408 X |
| 2,786,527 | 3/1957 | Burns | 83—408 X |
| 3,110,208 | 11/1963 | Mitchell et al. | 83—302 |

FOREIGN PATENTS 659,051 4/1938 Germany.

WILLIAM W. DYER, JR., *Primary Examiner.*

J. M. MEISTER, *Assistant Examiner.*